United States Patent

Gleason et al.

Patent Number: 6,103,094
Date of Patent: Aug. 15, 2000

[54] METHOD FOR CONTROLLING ELECTROCHEMICAL DRILLING

[75] Inventors: Mark J. Gleason, Madisonville; Barry T. Malone, Dawson Springs; Terri K. Brown, Central City; Darrin L. Smith; Brian K. Howell, both of Madisonville; Jason S. Mogle, Hanson; Edwin D. Tyler, Princeton; Michael D. Simcox, Providence, all of Ky.

[73] Assignee: General Electric Company, Cincinnati, Ohio

[21] Appl. No.: 09/139,167

[22] Filed: Aug. 24, 1998

[51] Int. Cl.⁷ .................................................. B23H 3/00
[52] U.S. Cl. ...................... 205/640; 205/640; 205/645; 205/654; 205/665
[58] Field of Search .................................. 205/640, 665, 205/656, 686, 651, 652, 645, 654

[56] References Cited

U.S. PATENT DOCUMENTS

| | | |
|---|---|---|
| 3,403,084 | 9/1968 | Andrews .................................. 205/665 |
| 3,849,271 | 11/1974 | Joslin . |
| 4,004,992 | 1/1977 | Tyler et al. . |
| 4,194,954 | 3/1980 | Faktor et al. ............................ 205/656 |
| 5,322,599 | 6/1994 | Peters ........................................ 205/665 |

*Primary Examiner*—Kathryn Gorgos
*Assistant Examiner*—Thao Tran
*Attorney, Agent, or Firm*—Andrew C. Hess; Gerry S. Gressel

[57] ABSTRACT

In the electrochemical drilling of a hole completely through a workpiece, the present invention proposes operating the power supply in a current regulating mode. Initially, a hollow cathode is positioned adjacent to a workpiece in which one or more holes are to be drilled. An electrolyte is flowed through the cathode and against the workpiece. A constant electrical current is applied between the cathode and the workpiece across the electrolyte. Then the cathode is advanced at a constant rate toward the workpiece for the drilling of the hole(s), while maintaining the electrolyte flow and current substantially constant.

5 Claims, 4 Drawing Sheets

METHOD FOR CONTROLLING ELECTROCHEMICAL DRILLING

TECHNICAL FIELD

The present invention relates to electrochemical drilling processes and, more particularly, to application of a controllable electrochemical drilling process to any product machined with electrochemical drilling.

BACKGROUND OF THE INVENTION

When electrochemically drilling a plurality of holes through a workpiece or workpieces of uniform thickness, the drilling operation is usually stopped when a preselected depth of movement of the drilling cathode has occurred. This is effective when there is a precise location of all the workpieces in exactly the same position or when the exit surface for the cathode is always in exactly the same position with respect to the feed of the cathode. However, differences in dimension of workpieces resulting from permitted tolerances cause the breakthrough surface not always to be at the desired location for the cathode to form the appropriate surface at the exit end of the hole being drilled. This problem is made especially difficult when drilling holes through a hollow body such as a turbine blade or vane as the tolerance buildup is doubled by the varying dimension of the outer surface of the blade on which the blade is supported during the drilling operation and the tolerance in wall thickness of the wall to be drilled.

There have been a number of electrochemical machining methods described and developed in the past. Electrochemical machining involves the use of a tool in the form of a nozzle which is made cathodic and which cooperates with an anodic workpiece through an electrolyte which contacts both the tool and the workpiece. Upon flow of electric current through the electrolyte, material of the workpiece is removed or depleted. These processes have been used to a large extent in drilling small diameter holes in metal which are difficult to drill mechanically.

In the prior art, electrochemical machine operators have relied on manually adjusting the power supply to maintain a constant voltage output from the power supply to drill a series of holes consistent in size from part to part, thereby imposing a constant voltage during the drilling operation. However, changes in the conductivity of the electrolyte caused by temperature, concentration, and contamination fluctuations result in changes in amperage output for a given voltage. Since the amount of material removed in an electrochemical process is directly dependent upon amperage and therefore only indirectly dependent upon voltage, the changes in amperage result in varied hole sizes. Although machine operators adjust voltage to compensate for the changing hole sizes, this generally cannot be done until after the holes are already drilled and measured.

It is an object of the present invention to reduce variation in drilled hole size caused by electrolyte conductivity changes.

It is a further object of the present invention to provide such a method which eliminates the need to control electrolyte temperature, concentration, and contamination as tightly as current methods require, while achieving equal results.

It is yet another object of the present invention to simplify machine operation by eliminating manual voltage control adjustment.

SUMMARY OF THE INVENTION

The present invention provides for a method for controlling the electrochemical drilling process by imposing constant amperage. The process of the present invention monitors and controls amperage, rather than voltage, to drill holes electrochemically. The process involves ensuring that the amperage output from the power supply to the drilling machine is constant under all conditions and circumstances. Instead of using a voltage regulating mode from the power supply to drill a specific hole size, the power supply operates in an amperage regulating mode.

In accordance with one aspect of the present invention, in the electrochemical drilling of a hole into or through a workpiece, the present invention proposes operating the power supply in a current regulating mode. Initially, a hollow cathode is positioned adjacent to a workpiece into which one or more holes are to be drilled. An electrolyte is flowed through the cathode and against the workpiece. A constant electrical current is applied between the cathode and the workpiece across the electrolyte. Then the cathode is advanced at a constant rate toward the workpiece for the drilling of the hole(s), while maintaining the electrolyte flow and current substantially constant.

In the drawings as hereinafter described, a preferred embodiment is depicted; however, various other modifications and alternative constructions can be made thereto without departing from the true spirit and scope of the invention.

BRIEF DESCRIPTION OF THE DRAWINGS

The novel features of the invention are set forth with particularity in the appended claims. The invention itself, however, both as to organization and method of operation, together with objects and advantages thereof, may best be understood by reference to the following description taken in conjunction with the accompanying drawings in which:

DETAILED DESCRIPTION OF THE INVENTION

The present invention pertains to any product machined with an electrochemical drilling process. Electrochemical drilling processes are known in the art, but in the existing art the power supply is adjusted to maintain a constant voltage output from the power supply to drill a series of holes consistent in size from part to part. In accordance with the present invention, the same electrochemical drilling process adjusts the power supply to maintain a constant amperage to drill a series of holes consistent in size from part to part.

Figure 1:
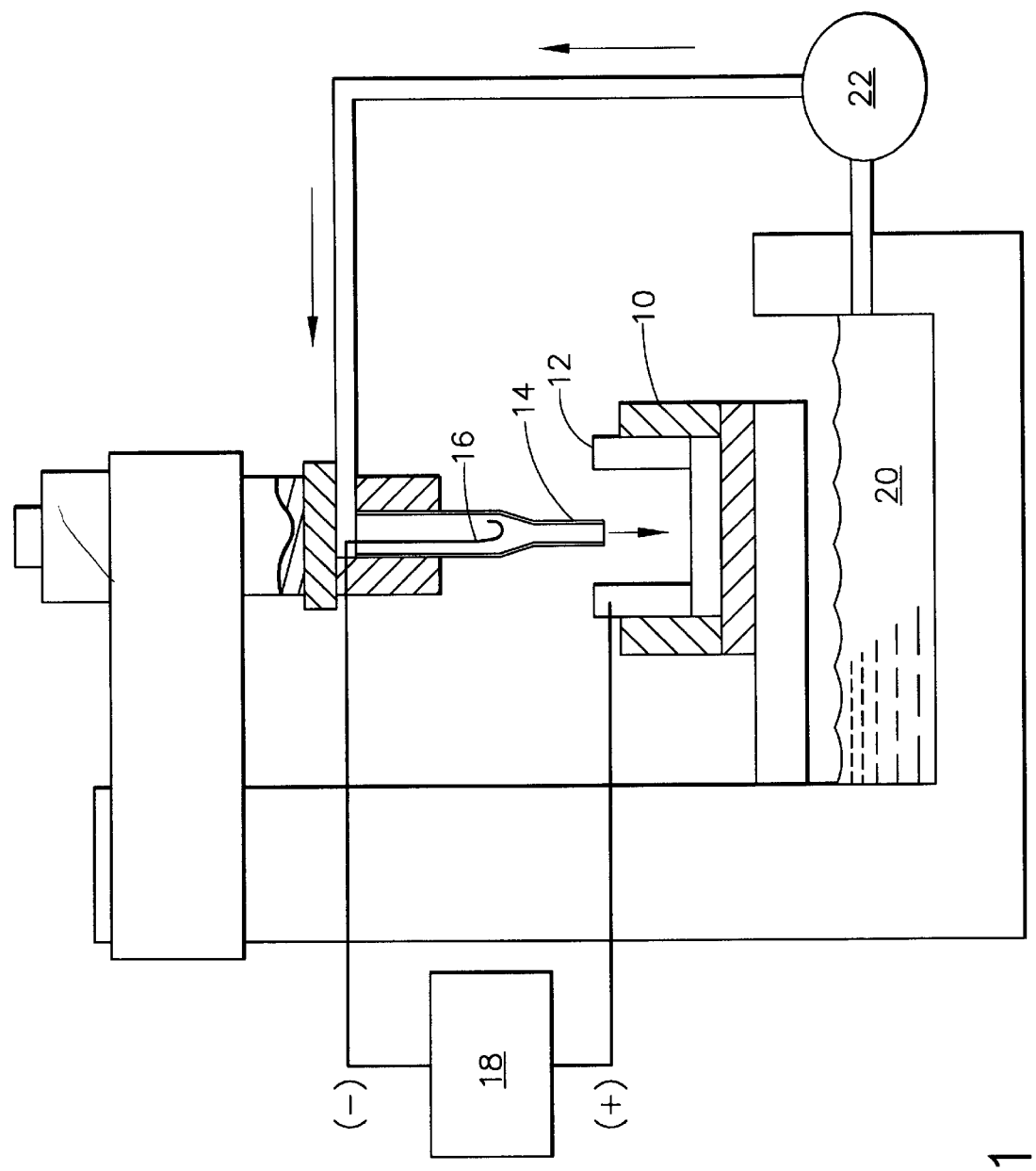
FIG. 1 is an illustration of a typical electrochemical drilling process.

Referring to FIG. 1, a schematic diagram is shown to illustrate the transformation of electrical energy into electrochemical energy. In FIG. 1, a fixture 10 holds workpiece 12 in position. Workpiece 12 is an anode having a positive charge, and glass nozzle 14 with wire 16 is a cathode having a negative charge, associated with power supply 18. A charged acid solution, or electrolyte, 20, is pumped through the glass nozzle 14, via pump means 22, and directed at workpiece 12. The electrochemical reaction dissolves (through oxidation) material (i.e., the workpiece 12) in front of the glass nozzle. The nozzle 14 "follows" the hole at the feedrate, i.e., the rate that the material of workpiece 12 is being dissolved.

Figure 2:
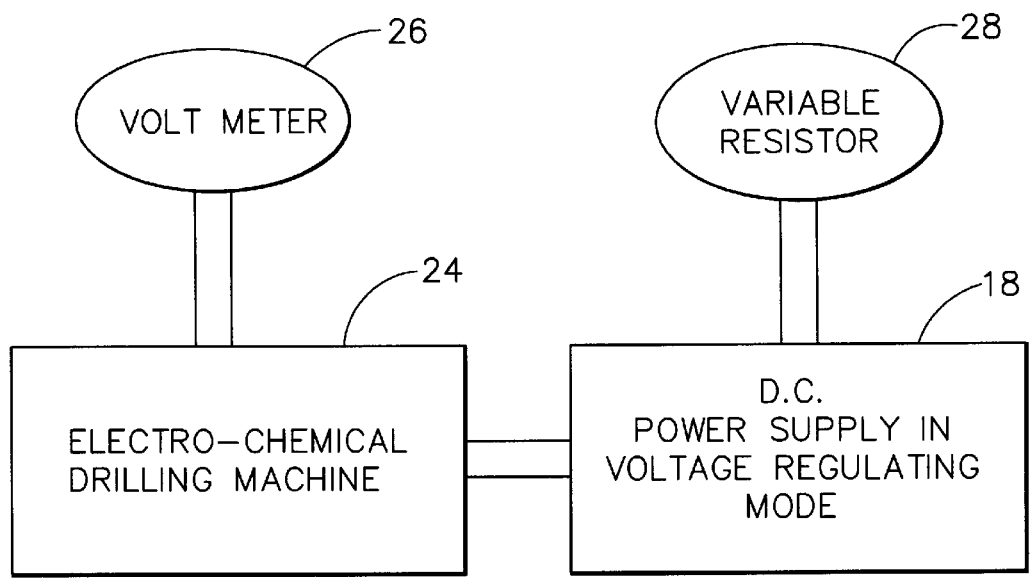
FIG. 2 is a schematic block diagram illustrating a prior art method for controlling the electrochemical drilling process of FIG. 1.

In the prior art, electrochemical drilling machine operators using a process such as is illustrated in FIG. 1, relied on manual adjustment of the power supply 18 to maintain a constant voltage output from the power supply 18, as is illustrated in the schematic block diagram of FIG. 2. In FIG. 2, the D.C. power supply operates in a voltage regulating mode. The operator adjusts the power supply 18 at the drilling machine 24, to maintain a constant voltage output, measured by volt meter 26. The operator can achieve a desired voltage output by manually varying an external variable resistor 28 coupled to the power supply 18.

In accordance with the present invention, the electrochemical drilling process such as is illustrated in FIG. 1 is monitored and controlled with constant amperage, not voltage, to drill holes electrochemically. As will be understood by those skilled in the art, the actual process for controlling amperage may vary, without departing from the concept of the present invention, which is to control the electrochemical drilling process with amperage.

Figure 3:
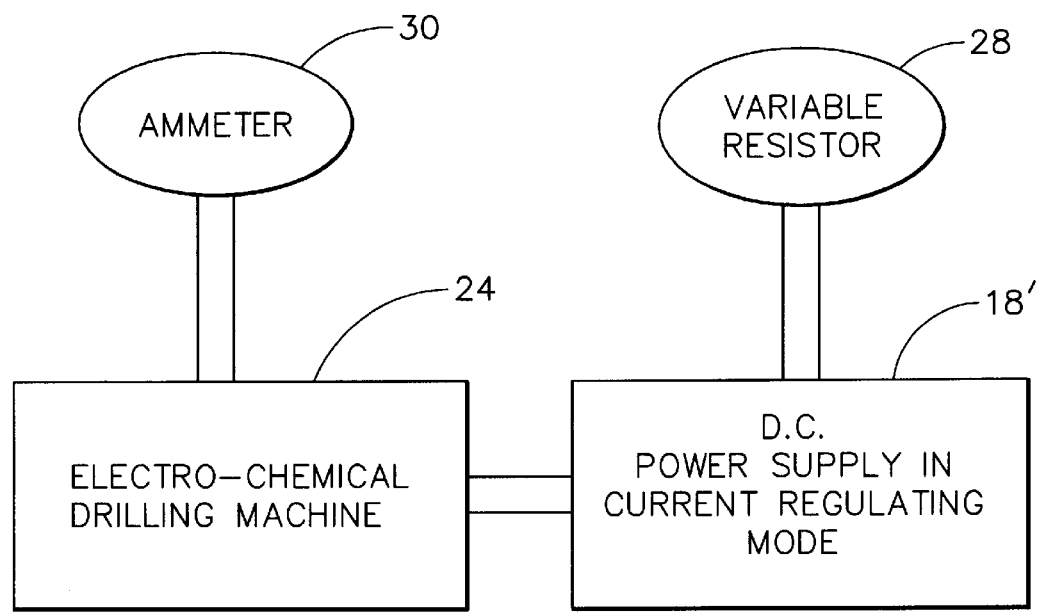
FIGS. 3–5 are schematic block diagrams illustrating the novel method for controlling the electrochemical drilling process in accordance with the present invention.

Referring now to FIG. 3, there is illustrated one embodiment for carrying out the purpose of the present invention. The method of FIG. 3 relies on the machine operator to monitor the amperage output from the power supply and manually control the output to the drilling machine. In FIG. 3, the D.C. power supply 18' operates in a current regulating mode. The operator adjusts the power supply 18' at the drilling machine 24, to maintain a constant current output, measured by ammeter 30. The operator can achieve a desired current output by manually varying an external variable resistor 28 coupled to the power supply 18'.

Figure 4:
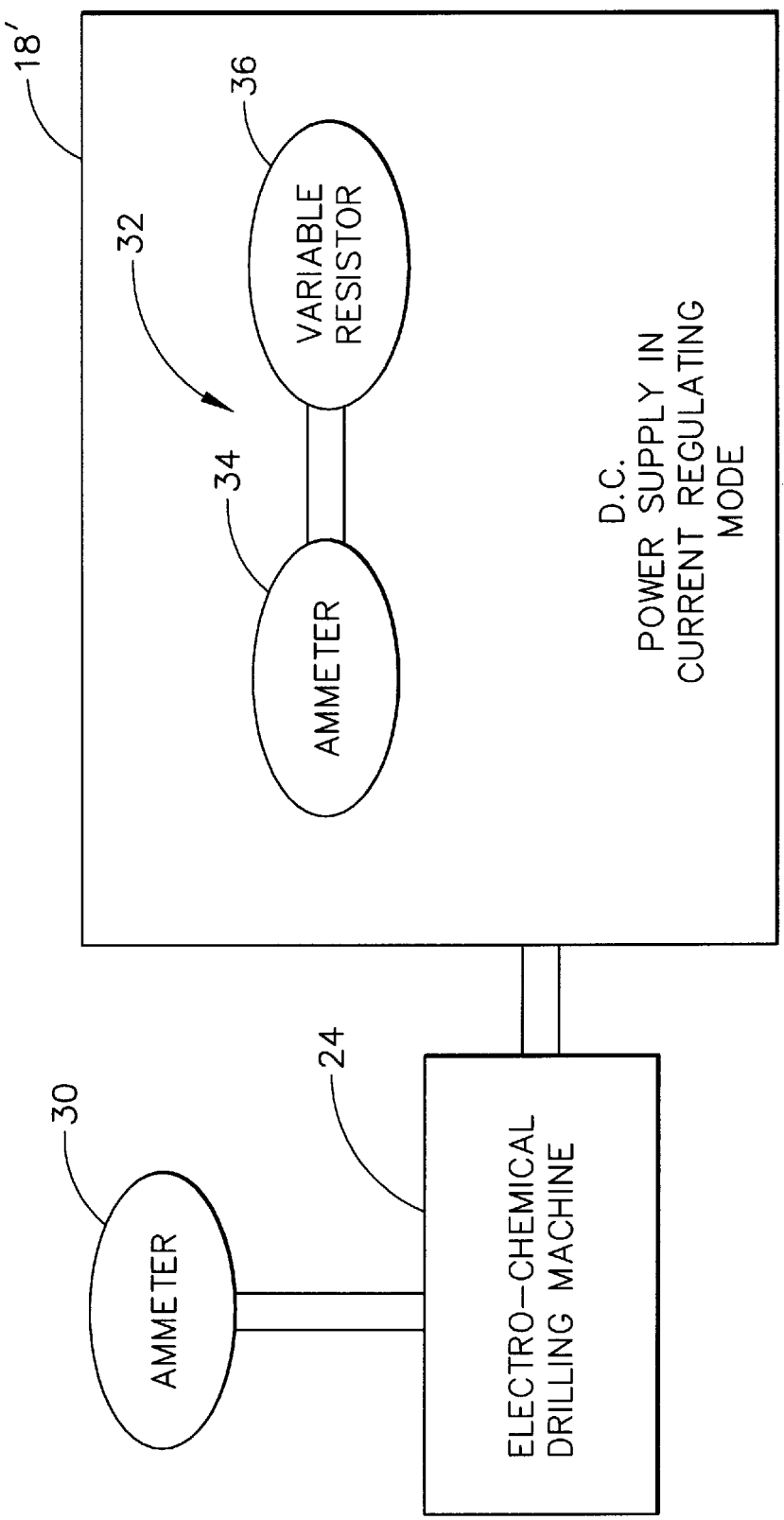
Figure 5:
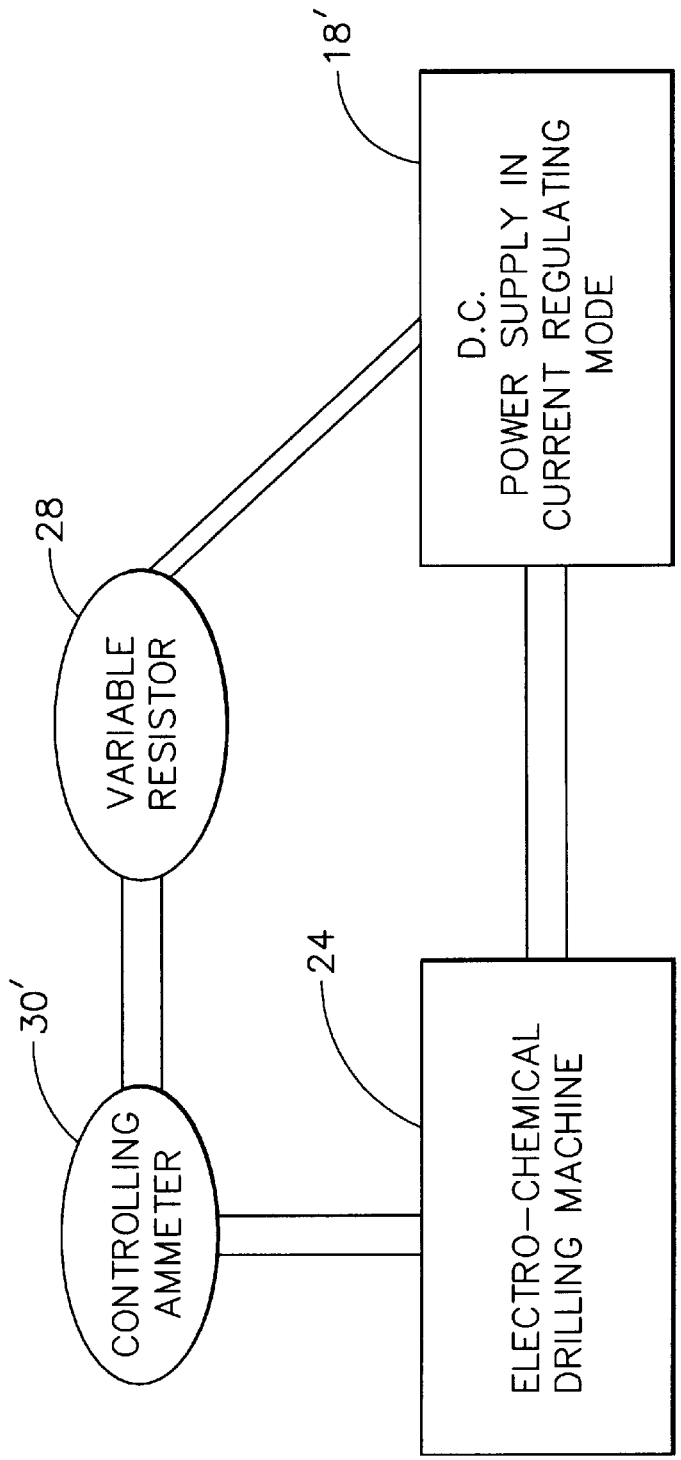

Alternatively, the arrangements illustrated in FIGS. 4 and 5 do not require operator intervention. In FIG. 4, the D.C. power supply 18' operates in a current regulating mode. The operator monitors the power supply 18' at the drilling machine 24, in amps, as measured by ammeter 30. However, power supply 18 comprises internal regulating circuitry 32, such as an ammeter 34 in series with a variable resistor 36, capable of outputting a constant current. Hence, the power supply 18' provides constant current to the drilling machine 24 without operator intervention.

Similarly, in FIG. 5, operator intervention is not required to maintain constant amperage to the drilling machine 24. In FIG. 5, an operator monitors the power supply 18' output at the drilling machine 24, in amps. However, an external controlling ammeter 30' varies the resistor 28, either electrically or mechanically, to achieve a constant current output.

While the principles of the invention have now been made clear in an illustrative embodiment, there will become obvious to those skilled in the art many modifications in structure, arrangement, and components used in the practice of the invention and otherwise which are particularly adapted for specific operating requirements without departing from those principles. The appended claims are therefore intended to cover and embrace any such modifications, within the limits only of the true spirit and scope of the invention.

What is desired to be secured by Letters Patent is the invention as defined in the following claims:

What is claimed is:

1. In the method of electrochemical drilling using an electrochemical drilling machine in which an insulating hollow cathode is positioned in closely spaced relation to an anodically charged workpiece, the insulating hollow cathode and the anodically charged workpiece having an associated power supply, and a highly conductive electrolyte is passed through said cathode to become cathodically charged and to impinge on said workpiece to initiate hole drilling, the improvement which comprises:

operating the power supply in a current regulating mode;

monitoring-amperage output from-the power supply to the drilling machine;

maintaining a constant amperage output from the power supply to the drilling machine by manually monitoring amperage output from the power supply and using internal regulating means in the power supply to output a constant current to the drilling machine, wherein the internal regulating means comprises an ammeter in series with a variable resistor; and advancing the cathode-at a constant rate toward the workpiece to initiate hole drilling while maintaining the electrolyte flow and current substantially constant.

2. A method as claimed in claim 1 wherein the step of maintaining a constant amperage from the power supply further comprises the step of controlling a regulator of the power supply to maintain constant amperage.

3. A method as claimed in claim 1 further comprising the step of providing an ammeter for measuring current output from the power supply.

4. A method as claimed in claim 1 wherein the step of maintaining a constant amperage from the power supply comprises the steps of:

manually monitoring amperage output from the power supply; and using external controlling means associated with the power supply to output a constant current to the drilling machine.

5. In the electrochemical drilling of a hole completely through a workpiece, the method comprising the steps of:

positioning a hollow cathode adjacent to the workpiece;

flowing an electrolyte through the cathode and against the workpiece;

applying a constant electrical current between the cathode and the workpiece across the electrolyte by manually monitoring amperage output from the power supply and using internal regulating means in the power supply to output a constant current to the drilling machine, wherein the internal regulating means comprises an ammeter in series with a variable resistor; and advancing the cathode at a constant rate toward the workpiece for the drilling of the hole while maintaining the electrolyte flow and current substantially constant.

* * * * *